United States Patent
Dimitropoulos et al.

(10) Patent No.: US 10,891,219 B1
(45) Date of Patent: Jan. 12, 2021

(54) CODE FAILURE PREDICTION SYSTEM

(71) Applicant: Electronic Arts Inc., Redwood City, CA (US)

(72) Inventors: Panagiotis Dimitropoulos, Vancouver (CA); Michael Marlowe, Vancouver (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 13 days.

(21) Appl. No.: 15/670,882

(22) Filed: Aug. 7, 2017

(51) Int. Cl.
  *G06F 9/44* (2018.01)
  *G06F 11/36* (2006.01)
  *G06N 20/00* (2019.01)

(52) U.S. Cl.
  CPC ...... *G06F 11/3688* (2013.01); *G06F 11/3684* (2013.01); *G06F 11/3692* (2013.01); *G06N 20/00* (2019.01)

(58) Field of Classification Search
  CPC ............. G06F 11/3688; G06F 11/0772; G06F 11/0778; G06F 11/0787; G06F 11/3611; G06F 11/08
  See application file for complete search history.

(56) References Cited

U.S. PATENT DOCUMENTS

| | | | |
|---|---|---|---|
| 8,719,791 B1 * | 5/2014 | MacPherson | G06F 9/4486 717/124 |
| 8,997,061 B1 | 3/2015 | Davison | |
| 9,009,539 B1 * | 4/2015 | Kompotis | G06F 11/3636 714/38.1 |
| 9,245,117 B2 * | 1/2016 | Weaver | G06F 21/55 |
| 9,898,391 B1 | 2/2018 | Morice et al. | |
| 10,282,280 B1 | 5/2019 | Gouskova et al. | |
| 2003/0005044 A1 | 1/2003 | Miller et al. | |
| 2005/0138104 A1 | 6/2005 | Houh et al. | |
| 2007/0233497 A1 | 10/2007 | Paek et al. | |
| 2009/0027402 A1 * | 1/2009 | Bakalash | G06F 9/5044 345/505 |
| 2009/0070746 A1 | 3/2009 | Dhurjati et al. | |
| 2009/0113251 A1 * | 4/2009 | Goossen | A63F 13/00 714/46 |
| 2009/0113303 A1 | 4/2009 | Goossen et al. | |

(Continued)

OTHER PUBLICATIONS

Zalavadia, *How to use predictive analytics to optimize software delivery*, Mar. 21, 2017.

(Continued)

*Primary Examiner* — Lewis A Bullock, Jr.
*Assistant Examiner* — Mohammad H Kabir
(74) *Attorney, Agent, or Firm* — Knobbe, Martens, Olson & Bear, LLP

(57) ABSTRACT

Target testing code based on failure paths can improve hit rates and reduce memory consumption. Aggregating failure signatures into clusters can help to identify additional tests to perform. Further, the signature clusters can be used to automate testing of a video game by, for example, identifying tests that test elements of the video game that are common to the signatures within a cluster and automatically executing the tests without user involvement. The results of the tests can be used to modify the video game state. The process of testing and modifying the video game can be performed iteratively until a signature for the video game no longer matches the cluster.

20 Claims, 9 Drawing Sheets

(56) References Cited

U.S. PATENT DOCUMENTS

| | | |
|---|---|---|
| 2010/0144443 A1 | 6/2010 | Graham |
| 2010/0144444 A1* | 6/2010 | Graham .................. A63F 13/10 |
| | | 463/42 |
| 2012/0204153 A1 | 8/2012 | Peterson et al. |
| 2012/0209571 A1 | 8/2012 | Peterson et al. |
| 2012/0311387 A1 | 12/2012 | Santhosh et al. |
| 2013/0205286 A1 | 8/2013 | Barraclough et al. |
| 2016/0041894 A1 | 2/2016 | Reid, III et al. |
| 2016/0179659 A1 | 6/2016 | Champlin-Scharff et al. |
| 2016/0262680 A1* | 9/2016 | Martucci ................ A61B 5/162 |
| 2016/0283353 A1 | 9/2016 | Owen et al. |
| 2016/0292065 A1 | 10/2016 | Thangamani et al. |
| 2017/0123961 A1* | 5/2017 | Cerny .................. G06F 11/3668 |
| 2017/0147470 A1 | 5/2017 | Bloching et al. |
| 2017/0201779 A1* | 7/2017 | Publicover .............. H04W 4/21 |
| 2017/0230417 A1 | 8/2017 | Amar et al. |
| 2017/0233497 A1 | 8/2017 | Labrijn et al. |
| 2017/0242780 A1 | 8/2017 | Arbel |
| 2017/0259177 A1* | 9/2017 | Aghdaie ................ A63F 13/67 |
| 2017/0322917 A1 | 11/2017 | Goyal et al. |
| 2017/0339037 A1* | 11/2017 | Cheh .................... H04L 63/123 |
| 2018/0165723 A1 | 6/2018 | Wright et al. |
| 2018/0275989 A1 | 9/2018 | Kakkad et al. |
| 2018/0293158 A1 | 10/2018 | Baughman et al. |
| 2020/0089594 A1 | 3/2020 | Zhou et al. |

OTHER PUBLICATIONS

Borovikov, et al., From Demonstrations and Knowledge Engineering to a DNN Agent in a Modern Open-World Video Game, Presentation Slides, 2019.

Borovikov, et al., From Demonstrations and Knowledge Engineering to a DNN Agent in a Modern Open-World Video Game, Published Apr. 26, 2019.

Borovikov, et al., Imitation Learning via Bootstrapped Demonstrations in an Open-World Video Game, Dec. 2018.

Borovikov, et al., Towards a Representative Metric of Behavior Style in Imitation and Reinforcement Learning, 23rd Annual Signal and Image Sciences Workshop at Lawrence Livermore National Laboratory (LLNL), Center for Advanced Signal Image Sciences (CASIS). May 15, 2019.

Borovikov, et al., Towards Interactive Training of Non-Player Characters in Video Games, Jun. 3, 2019.

Borovikov, et al., Towards Interactive Training of Non-Player Characters in Video Games, Presentation Slides, Jun. 14, 2019.

Zhao, et al., Winning Isn't Everything: Enhancing Game Development with Intelligent Agents, Aug. 20, 2019.

* cited by examiner

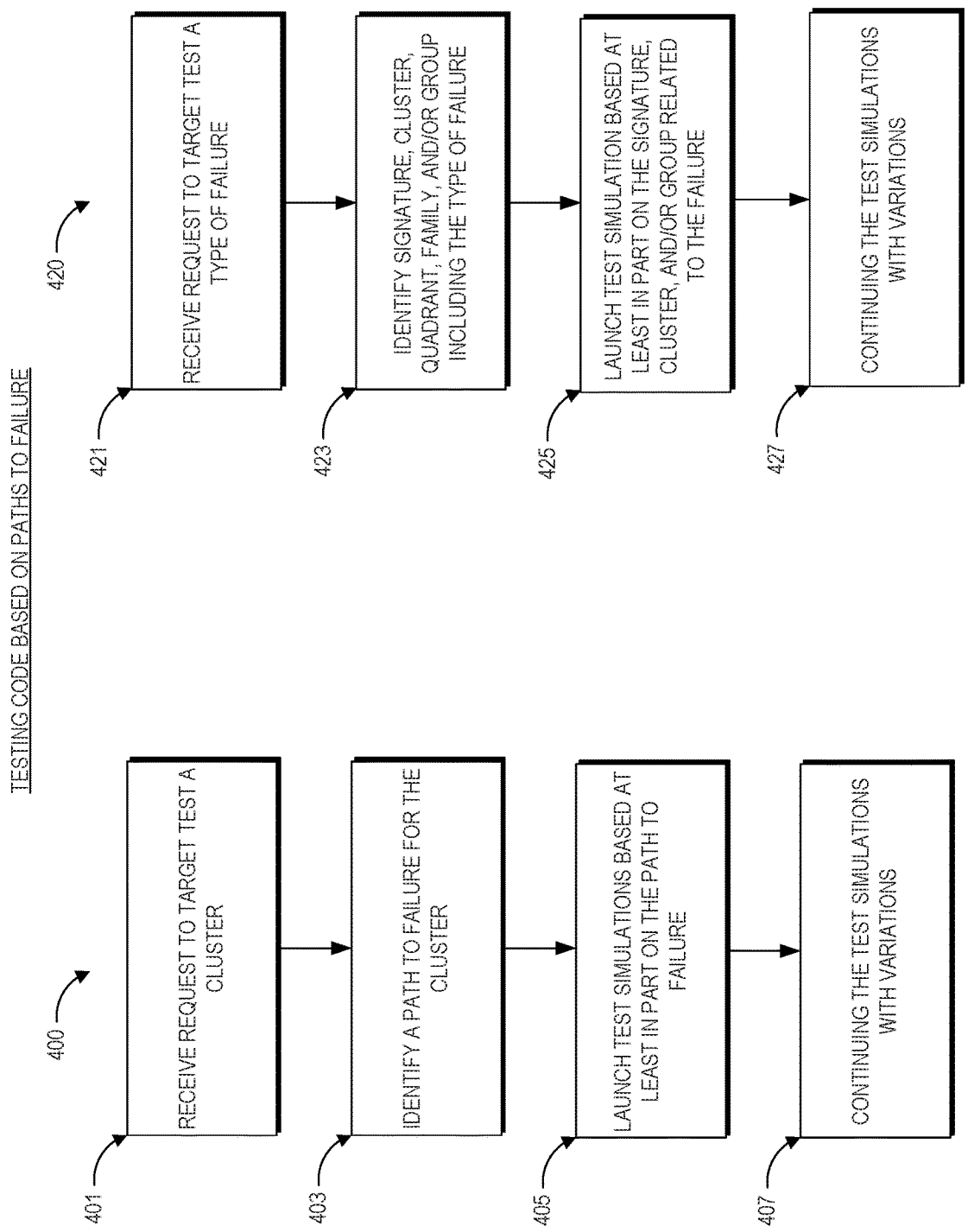

CODE FAILURE PREDICTION SYSTEM

BACKGROUND

Field

This disclosure generally relates to debugging tools, failure prediction, and video games.

Description of the Related Art

The code development process can include pre-release and post-release code testing. Despite efforts to eliminate bugs or coding errors from code, the code may still have bugs. It can be difficult to track down the cause of the bug. Code execution in multi-computer environments can compound the difficulty of finding bugs in code. For example, code for a video game may run on a console that connects to a server that runs different code for hosting the video game. Furthermore, the code may go through different revisions and include alpha, beta, release, and post-release versions. Accordingly, many relationships between different reports of code failures may go unnoticed.

SUMMARY

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments of the present disclosure, a method for video game failure analysis is disclosed. This method can be implemented by an interactive computing system configured with specific computer-executable instructions. The method can include receiving first failure data from a first data source related to an instance of a video game where a failure occurred. The method can include receiving context data from a context data source, wherein the context data relates to the instance of the video game where the failure occurred. The method can include creating a first failure signature that includes at least a subset of the first failure data and a subset of the context data. The method can include comparing the first failure signature to a cluster of failure signatures using a weighted comparison. The method can include determining based on the weighted comparison that the first failure signature has a threshold similarity to signatures included in the cluster of failure signatures. The method can include including the first failure signature as part of the cluster of failure signatures. The method can include determining a first video game state based at least in part on a plurality of signatures in the cluster, the video game state at least partially matching one or more video game states associated with the plurality of signatures in the cluster. The method can include configuring a test instance of the video game to execute the video game in the first video game state.

In certain embodiments, the first failure data includes a sequence of logged events that occurred in a computing system before the computing system had the failure. In certain embodiments, the method can further include receiving a second video game state for analysis, comparing parts of the second video game state to the first failure signature, and based at least in part on a match between a portion of the second video game state and a portion of the first failure signature, determining a probability that the second video game state will lead to a failure. In some embodiments, the method can further include running a second test instance of the video game based at least in part on a variation of the failure path. In some embodiments, the first data source includes at least one of: a forum for reporting failures of a video game, a database of video game failure reports generated on end-user devices in response to a failure of the video game; failure reports generated by a server hosting the video game, failure data from a test environment configured to execute one or more instances of the video game, video game debug data, a database identifying relationships between players and video games, metadata about testing the video game, or video game replay data, and the context data source differs from the first data source. In some embodiments, the method can further include comparing the cluster to a second cluster, and storing the cluster and the second cluster in a database as part of a family of clusters. In some embodiments, the method can further include determining the subset of the first failure data based at least in part on a machine learning model, and determining the subset of the context data based at least in part on the machine learning model.

Certain embodiments of the present disclosure relate to a system comprising a communications interface configured to: receive first failure data from a first data source related to an instance of a code where a failure occurred and receive context data from a context data source. The context data can relate to the same instance of the code where the failure occurred. The system can also include one or more hardware processors configured to: generate first failure signature that includes at least a subset of the first failure data and a subset of the context data, compare the first failure signature to a cluster of failure signatures using a weighted comparison, determine based on the weighted comparison that the first failure signature has a threshold similarity to signatures included in the cluster of failure signatures, include the first failure signature as part of the cluster of failure signatures, determine a state common based at least in part on a plurality of signatures in the cluster, the video game state at least partially matching one or more video game states associated with the plurality of signatures in the cluster, and configure a test instance of the video game to satisfy the state determined based at least in part on the plurality of signatures in the cluster.

In certain embodiments of the system, the first failure data includes a sequence of logged events that occurred in a computing system before the computing system had the failure. In certain embodiments of the system, the communications interface is further configured to receive a second video game state for analysis, and the one or more processors are further configured to: compare parts of the second video game state to the first failure signature, and based at least in part on a match between a portion of the second video game state and a portion of the first failure signature, determine a probability that the second video game state will lead to a failure. In certain embodiments of the system, the one or more processors are further configured to run a second test instance of the video game based at least in part on a variation of the failure path. In certain embodiments of the system, the first data source includes one of: a forum for reporting failures of a video game, a database of video game failure reports generated on end-user devices in response to a failure of the video game, failure reports generated by a server hosting the video game, failure data from a test environment configured to execute one or more instances of the video game, video game debug data, a database identifying relationships between players and video games, metadata about testing the video game, and video game replay data, and the context data source differs from the first data source. In certain embodiments of the system, the one or more processors are further configured to: compare the cluster to a second cluster, and storing the cluster and the second cluster in a database as part of a family of clusters. In certain embodiments of the system, the one or more processors are further configured to: determine the subset of the first failure data based at least in part on a machine learning model, and determine the subset of the context data based at least in part on the machine learning model.

Certain embodiments of the present disclosure relate to a non-transitory, computer-readable storage medium storing computer readable instructions that, when executed by one or more computing devices, causes the one or more computing devices to perform operations. The operations can include receiving first failure data from a first data source related to an instance of a video game where a failure occurred. The operations can include receiving context data from a context data source differing from the first data source, the context data being in a different data format than the first failure data, wherein the context data relates to the same instance of the video game where the failure occurred. The operations can include creating a first failure signature that includes at least a subset of the first failure data and a subset of the context data. The operations can include comparing the first failure signature to a cluster of failure signatures using a weighted comparison. The operations can include determining based on the weighted comparison that the first failure signature has a threshold similarity to signatures included in the cluster of failure signatures. The operations can include including the first failure signature as part of the cluster of failure signatures. The operations can include determining a video game state based at least in part on a plurality of signatures in the cluster, the video game state at least partially matching one or more video game states associated with the plurality of signatures in the cluster. The operations can include configuring a test instance of the video game to satisfy the video game state determined based at least in part on the plurality of signatures in the cluster.

In certain embodiments, the first failure data includes a sequence of logged events that occurred in a computing system before the computing system had the failure. In certain embodiments, the operations can further include: receiving a second video game state for analysis, comparing parts of the second video game state to the first failure signature, and based at least in part on a match between a portion of the second video game state and a portion of the first failure signature, determining a probability that the second video game state will lead to a failure. In certain embodiments, the operations can further include running a second test instance of the video game based at least in part on a variation of the failure path. In certain embodiments, the first data source can include one of: a forum for reporting failures of a video game, a database of video game failure reports generated on end-user devices in response to a failure of the video game, failure reports generated by a server hosting the video game, failure data from a test environment configured to execute one or more instances of the video game, video game debug data, a database identifying relationships between players and video games, metadata about testing the video game, and video game replay data. In certain embodiments, the context data source can differ from the first data source. In certain embodiments, the operations can further include comparing the cluster to a second cluster, and storing the cluster and the second cluster in a database as part of a family of clusters.

For purposes of summarizing the disclosure, certain aspects, advantages, and novel features are described herein. It is to be understood that not necessarily all such advantages may be achieved in accordance with any particular embodiment. Any embodiment may be carried out in a manner that achieves or optimizes one advantage or group of advantages as taught herein without necessarily achieving other advantages as may be taught or suggested herein.

BRIEF DESCRIPTION OF THE DRAWINGS

FIGS. 4A and 4B are flowcharts of an example of a process for target testing code.

DETAILED DESCRIPTION

Introduction

Figure 1A:
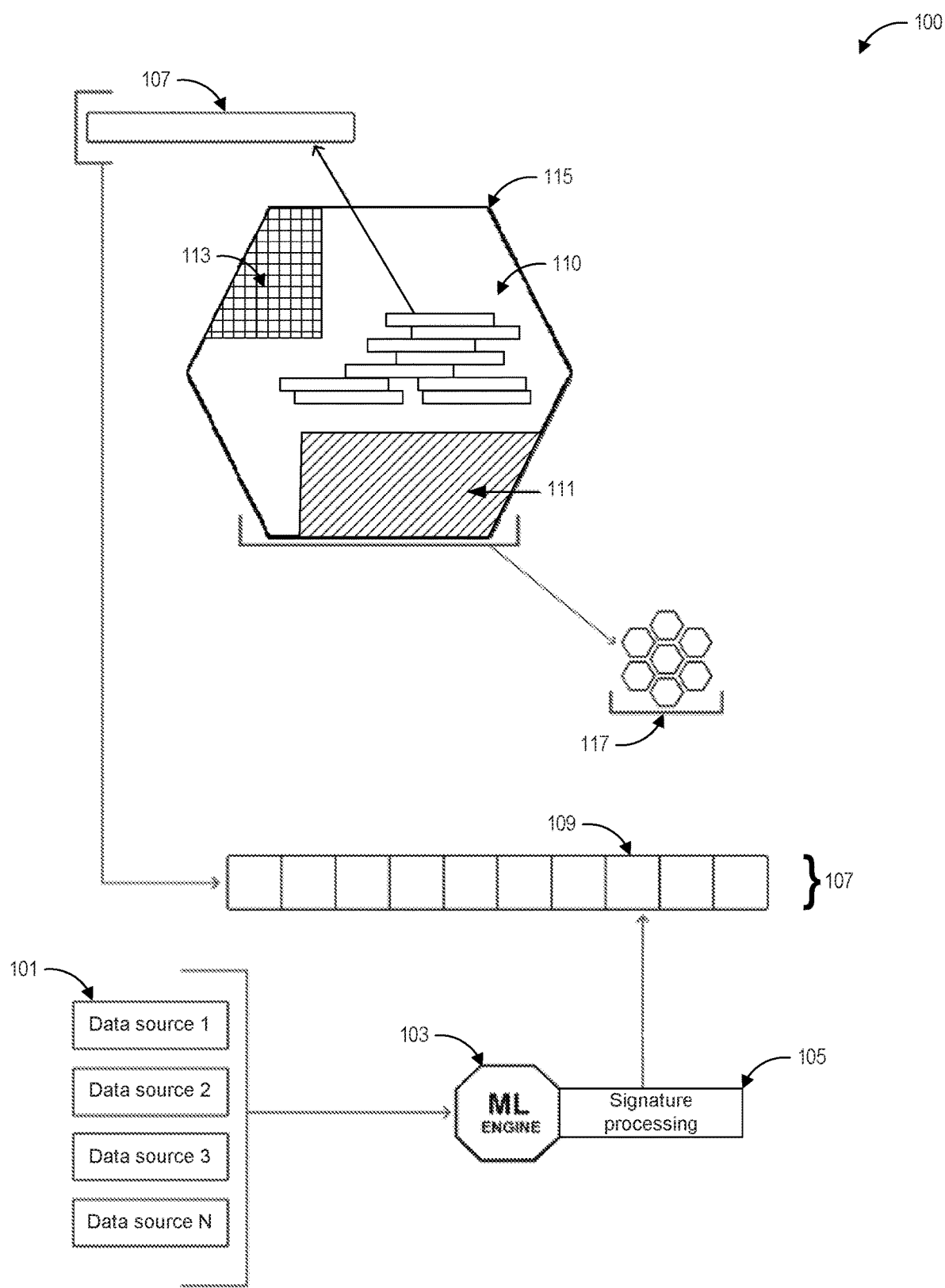
FIG. 1A shows a block diagram of an example signature generation and clustering environment.

The code development and testing process can be difficult. Despite the best efforts of code developers, computer code can fail in different ways. There can be failures due to human coding error, poorly written code, logic errors, and the like. Sometimes, well-written code can still fail due to factors outside of the code itself, such as due to incompatibilities with hardware, drivers, or third party software. As another example, some code may work on one version of an operating system, but failures may arise when the operating system version is updated, when a virus scanner blocks the code from working, or when a graphics card is changed. As another example, code may be used in ways never envisioned and never tested by code developers. As another example, some code might rely on network communications and fail due to unanticipated network deficiencies, such as lag, interrupted connections, or other network conditions.

Code failures can result in bugs, glitches, errors, application crashes, computer stop errors, memory errors, unintentionally exploitable features, undocumented functionality, an application executing at a speed that is slower or faster than expected or other metrics. Additionally, some examples of failures in video games can include graphical artifacts, frame rate drops, lag, incorrect graphics rendering, impossible physics behavior, sound glitches, breaking the rules of the video game, unscripted storyline, players accessing off-limit areas, unfair and unintended competitive advantages, and other types of failures.

It can be difficult for code developers to prevent or fix the different types of failures. Individual failures can be detected and analyzed with limited information. For example, a video game player or user might report a bug through an online support forum, providing details about the symptoms of the bug or crash. As another example, as a result of a video game crash, an application might automatically upload crash dump data to a server for analysis, and the crash dump data might include a memory state of the computing device running the video game at the time of the crash. As another example, there can be a test center that runs instances of a video game under debug conditions, collecting detailed logs of each step of the code. As another example, a video game replay database might include replays of games where failures occurred.

In each of the example situations of the previous paragraph, a code developer might have some data relating to the error or crash, but this data may be incomplete. For example, in a post to a bug report forum, a user might describe what the user saw before a bug occurred, but the post might not include sufficient debug data to determine the cause of the bug. A code developer reviewing a memory dump might not know the visual symptoms that a player saw leading up to a crash event. Furthermore, although same types of failures can be submitted through multiple sources, developers might not know that a failure reported by a first player through a forum is related to a different failure that happened to a second player for which crash dump data is available. As a result, the code developers might troubleshoot a failure without the benefit of knowing all available data.

Another problem with troubleshooting code is that even when an available crash dump provides information about a state of a computer at a time of a crash, it cannot always be determined what caused the crash. There can be various events leading up to the failure that ultimately caused the failure, but those events may not be reflected in a final state captured in the crash dump data.

In some embodiments, a system can combine failure data from multiple, different sources. A machine learning engine can determine information relevant to detecting and troubleshooting code failures. The relevant information from multiple, different sources can be compiled into a failure signature and stored in a database. In the database, similar failure signatures can be grouped into clusters. Identifying the similar failure signatures can help developers by providing the developers with more sources of information about why similar failures occur, as well as help developers to identify common conditions that may cause the similar failures. Differences in similar, but non-identical, failure signatures can indicate variables that are less likely to be related to a similar failure.

The database can further store similar clusters into a family, and similar families into a group. Similarities in failure signatures shared across clusters, families, and/or groups can be used for target testing code failures. Target testing code failures based on the similarities can expose new, related failures and/or ensure that known failures are fixed. The failure signatures can also be used during regression testing. Target testing based on failure signatures can be more efficient than randomly generated test simulations that try to find failures and have a much higher failure hit rate. Improving the efficiency and hit rate of target testing can significantly cut down on the amount of time used to test for code failures and can also require significantly less computing resources.

In some embodiments, it can be helpful to predict the chances of a failure. A database can receive a video game signature generated from the video game code, compare the video game signature to failure signatures in a database, and based on a similarity between the video game signature and the failure signatures in a database, predict whether or not the video game is likely to fail. The result of the prediction can be used, for example, to turn on or off debug data. A simulation can execute an instance of a video game without debug logs. If it is determined from the video game signature that a failure is likely to occur, the debug tools can be turned on. By conditionally activating debug tools based on the video game signature, utilization of computational power, memory, and storage space can be reduced because the debug features do not need to constantly run and log activity, but instead run when the video game signature indicates a threshold chance of failure. In some embodiments, video game states that have a high likelihood of failure can be tested to reproduce failures so that the cause of the failure can be diagnosed and patched.

For purposes of providing an introduction, certain aspects, advantages, and novel features have been introduced. It is to be understood that not necessarily all such aspects, advantages, and novel features of the introduction are achieved in accordance with any particular embodiment. Thus, one or more aspects, advantages, and novel features may be achieved without necessarily achieving the other aspects, advantages, and novel features introduced so far. It is also to be understood that not necessarily all aspects, advantages, and novel features have been introduced in the introduction.

For improved comprehension and understanding, some examples are discussed with reference to video games. However, the technology disclosed herein can be applied to other types of failure analysis for other types of code.

Example Code Failure Prediction System

FIG. 1A shows a block diagram for an example signature generation and clustering environment 100. The environment 100 includes a plurality of data sources 101, a machine learning system 103, a signature processing system 105, a failure signature 107, a subsection 109 of the failure signature, a cluster 110 of signatures, quadrants 111 and 113, a family 115, and a group 117 of families.

Failure data can be generated through a variety of data sources 101. Data sources 101 can include crash reports, forums, diagnostics of code, simulation farms, and the like. Data sources 101 can include end-user devices that generate video game failure reports in response to a failure of the video game, a server that generates failure reports while hosting the video game, a test environment configured to execute one or more instances of the video game and generate debug logs or failure information, video game debug data, a database identifying relationships between players and video games, metadata about testing the video game, video game replay data, and the like. Data sources can also include players testing games, beta test results, computing systems configured to execute multiple instances of the game, farms of machines running the game, and the like. In some embodiments, some data sources 101 can provide information related to the player, profile, console, video game that experienced a failure. For example, a forum can be a first data source 101 when a player reports a bug. A second data source can be a database that stores data about the player's profile, including the hardware of the gaming console that the player uses. A third data source can be a server that stores replay data about the video game, which can include a replay of the instance where the failure occurred.

The data provided by a data source 101 can include, for example: crash dump data, a snapshot of a state of the video game, an image or video of the video game at or around the time of the failure, replay data, hardware specifications of a computing device running a video game, the version of the video game, logs of the video game, debug data, a profile of a user playing the video game, server-side data from a server hosting the video game, information about a player's profile, time, date, and the like. Different data sources 101 can provide different types of information in different formats. In some embodiments, the data can include events leading up to a failure. In some embodiments, the data can include: a location in a virtual world of a video game, a series of actions performed by a player before a failure, a series of actions that occurred in the video game before the failure, and one or more states of the video game leading up to, during, and/or after the failure. In various embodiments, some or all of the data can include time stamps. As one example, the data provided by data sources 101 includes bug report data, crash data generated from a computer where an instance of a video game crashed, a state of the video game when the video game crashed such as where the player was and what the player was engaged in, a game mode, and the like. Another data source 101 can include a log from a system that, upon detection of an incorrectly registered memory value, begins to log a sequence of events, including soft errors, until the game crashes with a hard or stop error.

Figure 6:
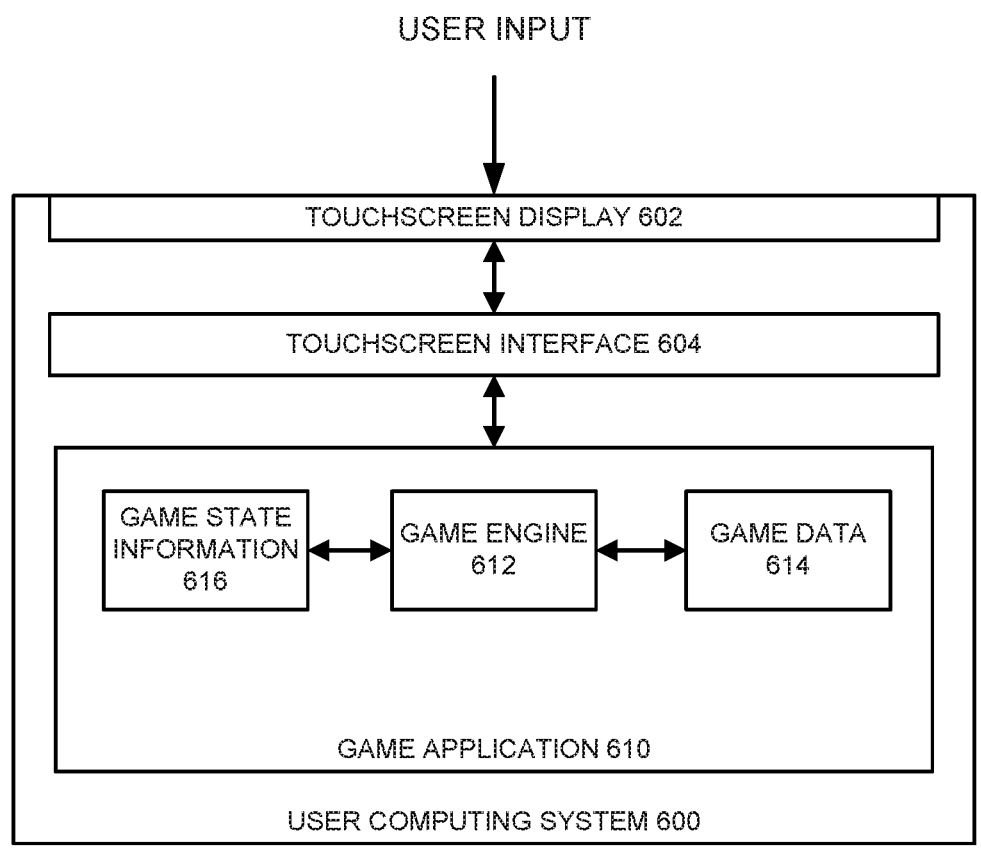
FIG. 6 shows a block diagram for a user computing system.

In some embodiments, the data sources 101 can be different hardware devices. For example, Data Source 1 can be a video game console or computer system (such as shown in FIG. 6) on which a failure occurred. If the failure is a crash, the video game console or computer system can, for example, generate a crash report and transmit the crash report to a code failure prediction system via a network and/or internet connection. Data Source 2 can be a server configured with a forum interface to receive submissions from users about failures and store submitted information in a database. The code failure prediction system can access the database to retrieve a submission associated with the crash report. Data Source 3 can be, for example, a server configured to store a replay or video of the video game being played when it crashed. The code failure prediction system can access Data Source 3 to retrieve the replay information.

A machine learning engine 103 can receive the data from the data sources 101. An example of a machine learning engine 103 and further details are discussed with respect to FIG. 3A and FIG. 3B. The machine learning engine 103 can determine which fields and/or types of data from the data sources 101 are relevant to diagnosing failures. The machine learning engine can make these determinations through a feedback process. As signatures are collected and analyzed for similarities between signatures, similarities between clusters, similarities between groups, and similarities between families, it can be determined which fields and/or types of data are useful for finding similarities or diagnosing failures, and which fields are not. For example, it can be determined that some types of failures occur at certain times, in certain video games, for certain versions of the video games, in certain game modes, on certain hardware, in certain levels of the game, when certain actions are performed, after certain types of initial failures, under other conditions, and the like. Other fields, such as a player's preference to receive communication by email instead of telephone, may not be correlated with an occurrence of any failure. The machine learning engine 103 can, as a result, determine that a player's communication preference does not need to be included in a failure signature 107.

The signature processing block 105 processes data from the data sources 101. At the signature processing block 105, the data from the data sources 101 can be filtered to determine a subset of data that is useful for diagnosing failures. The filtering can be based on determinations from the machine learning engine 103 of what to include in a failure signature. From each data source 101, the subset of data is added as part of a failure signature 109.

The failure signature 107 can be a unique collection of data from a plurality of different data sources, the data being related to a failure. Each illustrated square 109 in the failure signature 107 can represent data collected from a different data source 101. The collected data can include a series of data leading up to a failure event. Initially, each square 109 can represent all data provided from a data source 101. After machine learning or training cycles, each square 109 can represent a subset of data provided from a data source 101. Although the failure signature 109 is illustrated as a sequence of blocks, in some embodiments, the failure signature 109 can be a string of information.

Figure 7:
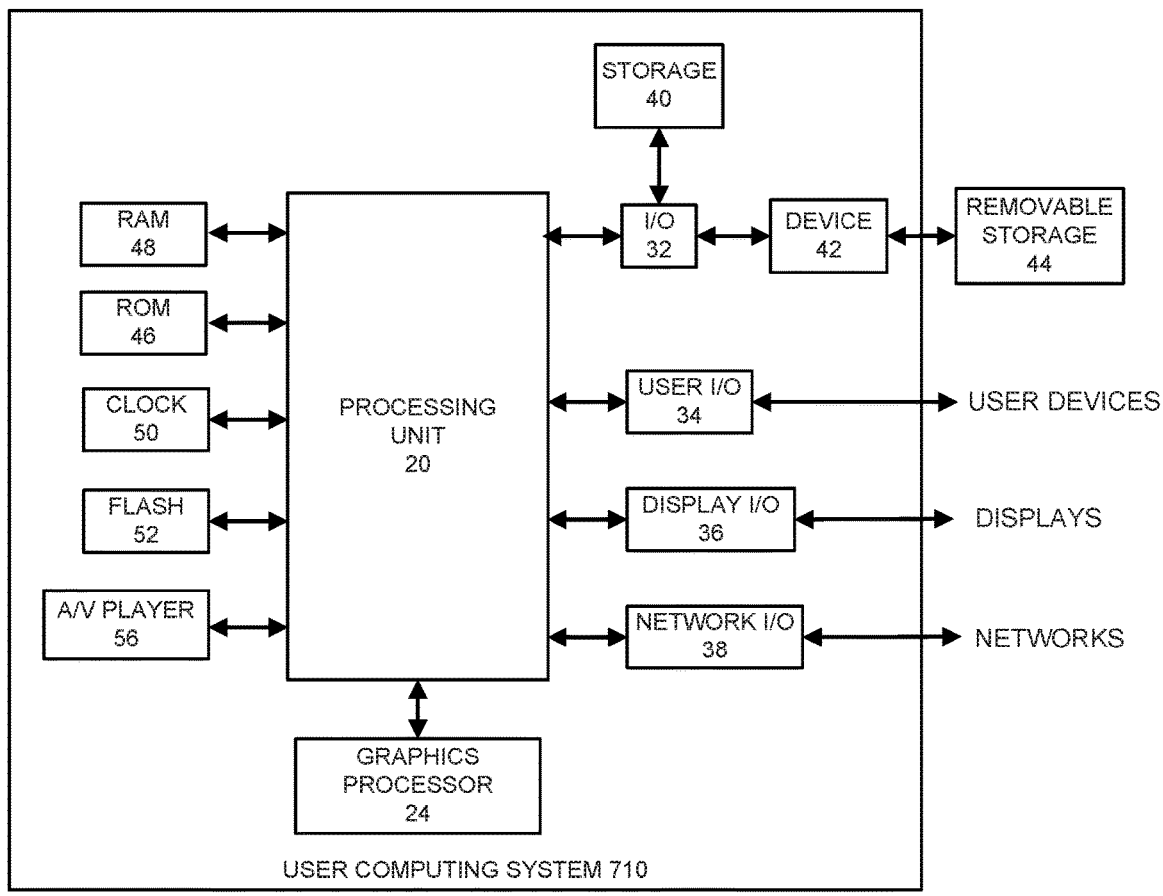
FIG. 7 shows a block diagram of a hardware configuration for the user computing system of FIG. 6.

The failure signature 107 can include, for example, user inputs leading up to a failure. The failure signature can also include a path of actions, data, or events leading up to a failure. Each failure signature 107 can include data from at least one data source (such as Data Source 1) that indicates a failure. However, a failure signature 109 can also include data from a different data source (such as Data Source 2) that does not necessarily indicate a failure. For example, a first data source can be a forum where a player reported that a bug occurred, where the player entered into the forum the name of the game being played, the time that the game was played, and the nature of a video glitch that occurred on the player's display device. A second data source can be a log from a server that hosted the instance of the video game that the player was playing when the glitch occurred. The log can include actions performed by the player in the video game and states of the video game, even if the log from the server did not detect or indicate any failures occurring on the server. A data source 101 can also include a sequence of events (such as in order and/or with timestamps) leading up to a failure, such as what a user did prior to a failure. The failure signature 107 can be stored in a memory (such as RAM 48 as shown in FIG. 7) and/or a non-volatile storage device (such as storage 40 as shown in FIG. 7).

A check can be performed to determine if the failure signature 107 is unique. If the failure signature is not already in the database, then the failure signature can be stored in the database.

A plurality of similar failure signatures 107 can be grouped together as part of a cluster 110 of failure signatures 107 in a database. Each new failure signature 107 can be compared against other failure signatures and clustered with the other failure signatures if the new failure signature 107 is similar to the other failure signatures. A natural weighted comparison between each respective data source between the new failure signature 107 and the other failure signatures can be performed to determine if a minimum similarity threshold is met. The comparison can include matching different elements of the signatures that may correspond to different levels of granularity. For example, in some cases, higher level elements or more coarse details may be compared, such as the video game being played, the type of failure that occurred, the platform that the game is being played on, and the like. Alternatively, or in addition, lower level or more granular details may be compared, such as, a level in the video game where the failure occurred, a sequence of inputs leading up to the failure, memory states, events that occurred in the video game, what the player was doing when the failure occurred, a sequence of one or more actions that the player took prior to the failure, and the like. The natural weighted comparison can be an algorithmically generated comparison, where some or all of the weighted factors are developed algorithmically and/or through machine learning. The weighted factors can be determined by one or more computers without being selected by a human. Further, the weighted comparison may be performed without human interaction.

A plurality of signatures 107 can be grouped together in a cluster 110. In some cases, a failure signature can be more similar to other failure signatures in the same cluster 110 than to failure signatures in a different cluster 110.

A plurality of clusters 110 can be grouped together in a quadrant. There can be different quadrants 111, 113. In some cases, a first failure signature can be more similar to other failure signatures in the same quadrant 111 than to failure signatures in a different quadrant 113.

A plurality of quadrants 111, 113 can be grouped together as part of a family 115 in a database. In some embodiments, two or more clusters 110 in one or more quadrants can be grouped into a family 115. In some cases, a first cluster within a family 115 can be more similar to other clusters within the same family 115 than to other clusters in a different family. To determine the similarity of clusters, the signatures within each of the families may be compared. In some cases, a first quadrant 111 within a family 115 can be more similar to other quadrants (for example, quadrant 113) within the same family 115 than to quadrants in a different family. In some cases, the signatures within the same family 115 are more similar to other signatures within the family 115 than to other signatures in a different family.

The plurality of families 115 can be put together as a group of families 117 in a database. In some cases, a first family 115 within the group of families 117 can be more similar to other families within the group of families 117 than to other families in a different group of families.

Each hierarchical level of grouping (signature, clusters, quadrants, families, and groups of families) can share certain similarities. The similarity can be referred to as a "path to failure." For example, a role playing video game might sometimes crash for a very small amount of users at a certain point within the video game when a player picks up an armor piece. A signature can capture a specific path to failure, including actions that an individual player took in the role playing video game leading up to the crash. The signature can include the version of the role playing video game, a specific level, and a specific sequence of actions performed by the player (moving in particular directions, jumping, speaking with non-player characters ("NPCs"), reaching a certain point in the level, and the like) leading up to a final action (such as picking up the armor piece) right before the failure occurs. A path to failure for a cluster, however, can reflect, for a plurality of players who played the same video game on the same level, a common set of actions (such as interacting with a particular NPC, reaching a certain point in the level) that are less specific than the specific sequence of actions leading up to a final action (such as picking up the armor piece) right before a failure occurs.

The paths to failure can act like a fingerprint for different types of failures. The fingerprints can be used for risk-based testing and crash automation. For example, a regression testing environment can be configured to check that, in a latest code revision, known path to failure is taken during a test execution of the code and none of the failures associated with those paths to failure occur. Similarly, the fingerprints can be analyzed to determine which factors are causing the most crashes. Further testing can be performed based on the factors associated with a high number of crashes. In targeted test automation, the paths to failure provide multi-dimensional presentations of actual failures and allow tests to reproduce failures at a much faster rate. For example, a failure path can be used as a starting point for running a video game, and that failure path can be run many times in order to try to reproduce the error, with or without variations.

Although FIG. 1A is described with respect to signatures, clusters, quadrants, families, and groups of families, the teachings herein can be applied to any number of hierarchical levels.

Figure 2:
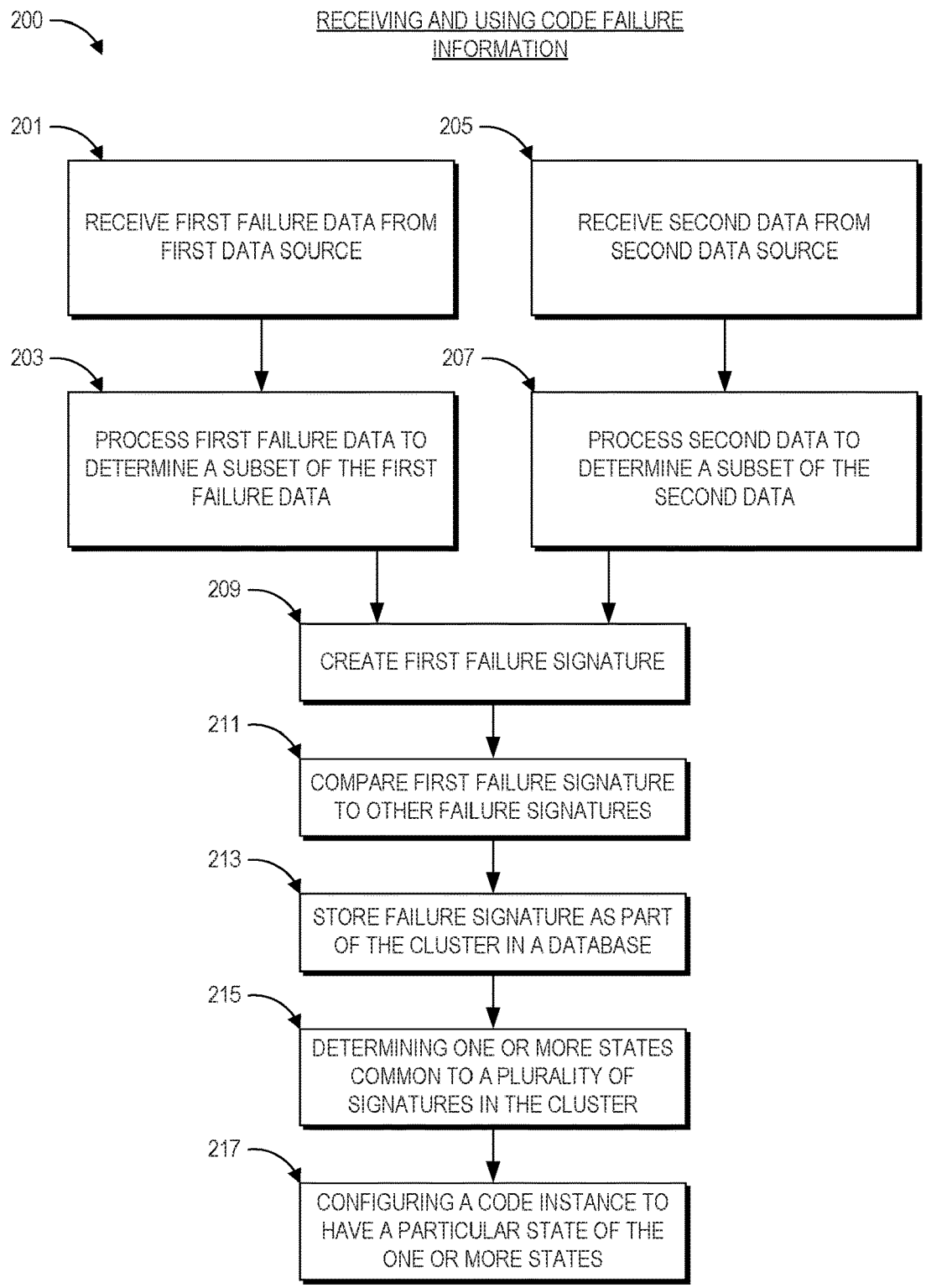
FIG. 2 is a flowchart of an example of a process for receiving code failure information.

The signature 107 is stored into a database, where it can be stored as part of a cluster in a quadrant in a family in a group of families, as further discussed with respect to FIG. 2. The database can be accessed to predict failures and to provide information for targeted failure testing.

The database can provide the paths to failure to systems that target test failures, as further discussed with respect to FIG. 4A and FIG. 4B. Target testing based on the paths to failure can increase the rate that failures are discovered so that the failures can be patched.

Figure 5:
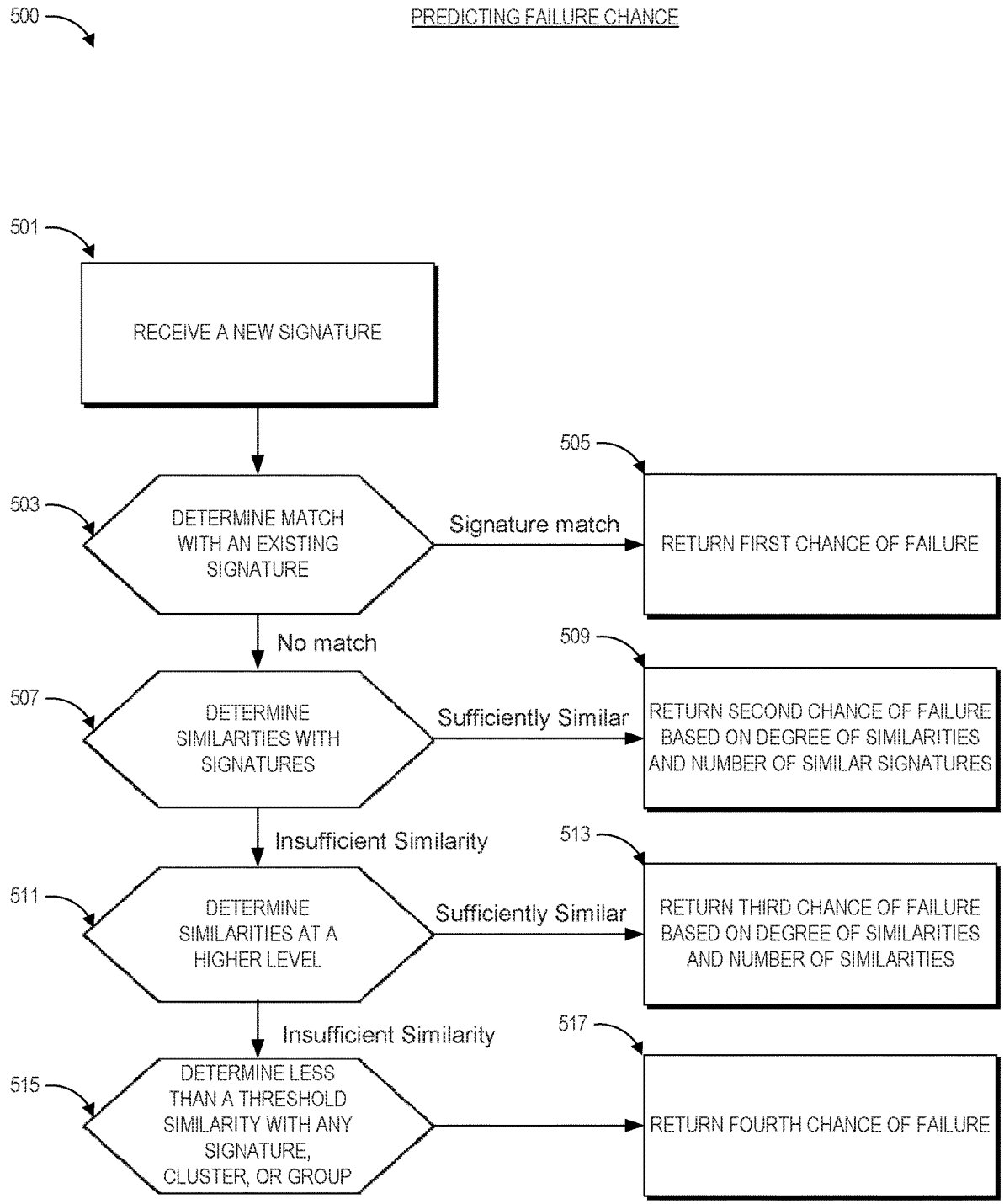
FIG. 5 is a flowchart of an example of a process for predicting a failure given a signature.

The database can be provided with a new signature to determine a likelihood that a failure will occur, as further discussed with respect to FIG. 5. This can be used for testing purposes, to reduce processor usage, and to reduce memory consumption. For example, as a video game progresses, it can be determined that a sequence of events and/or one or more states of the video game has a threshold similarity to a failure path. In response, additional diagnostic tools can be turned on to keep detailed debug logs. As another example, as a video game progresses in a test environment, it can be determined that a sequence of events and/or one or more states of the video game has a threshold similarity to a failure path, and the video game can be configured to repeatedly run through the same "high-risk" progression of events to ensure that no failure occurs and to automatically perform additional tests.

Figure 1B:
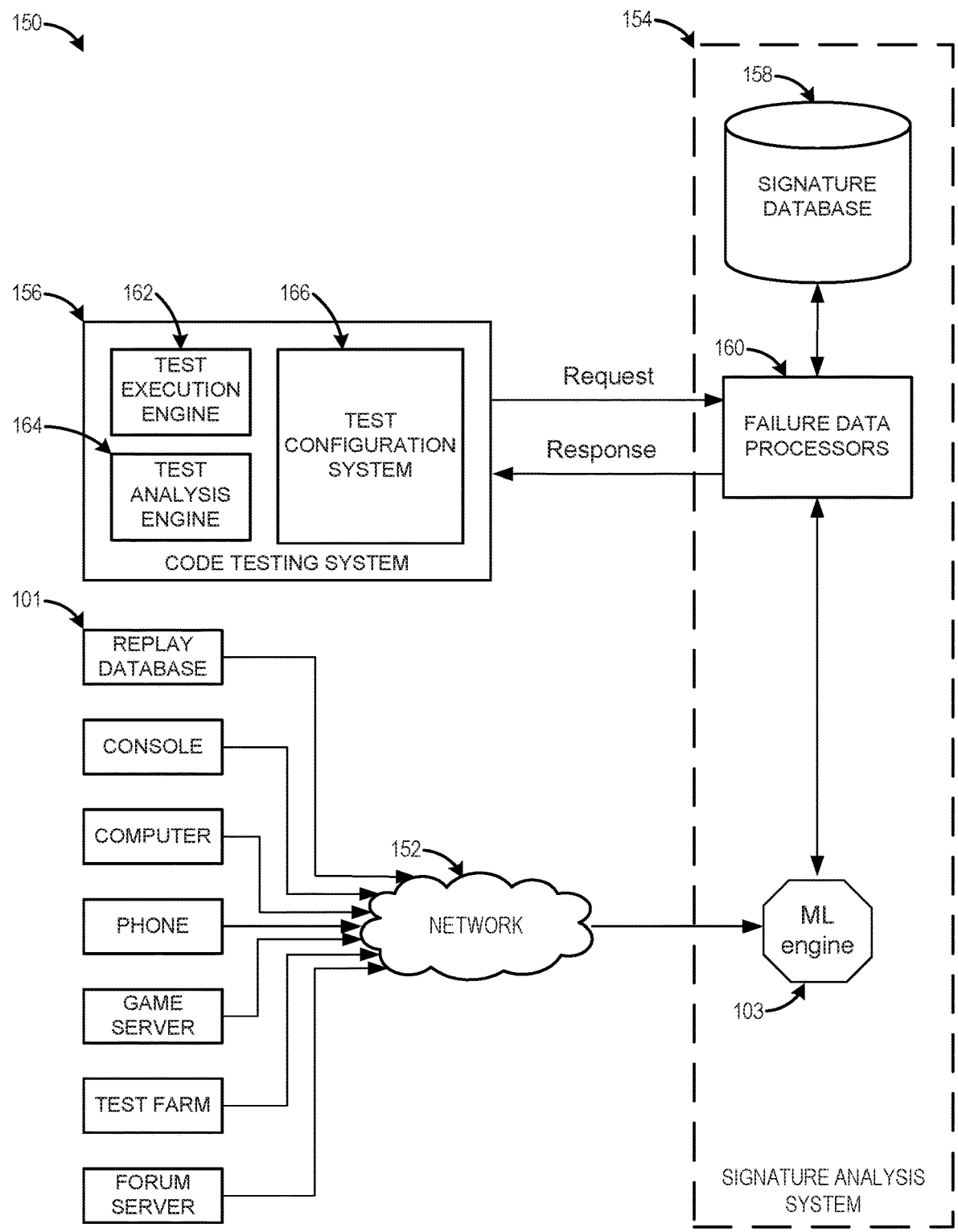
FIG. 1B shows a block diagram of an example system for code failure prediction.

FIG. 1B shows a block diagram of a system 150 for code failure prediction. The system in FIG. 1B can receive, process, and store the data according to the relationships discussed with respect to in FIG. 1A. FIG. 1B includes a plurality of data sources 101, a network 152, a signature analysis system 154, and a code testing system 156. The signature analysis system 154 can include the machine learning engine 103, a signature database 158, and one or more processors 160. The code testing system 156 can include a test execution engine 162, a test analysis engine, and a test configuration system 166.

Examples of data sources 101 can include, for example, replay databases, consoles, computers, phones, game servers, test farms, forum servers, and the like. Other examples of data sources can include databases of known code failures, the code testing system 156, or any other computing device configured to execute code. As discussed with respect to FIG. 1, the data sources 101 can experience code failures and report data about the code failures.

The data sources 101 can communicate through a network 152. In some examples, the network 152 can be the internet, a local area network, a virtual network, and the like. The data sources 101 can report data about the code failures through the network 152 to the signature analysis system 154.

The signature analysis system 154 can receive the reported data about code failures. The machine learning engine 103 can determine which fields and/or types of data from the data sources 101 are relevant to diagnosing failures. An example of a machine learning engine 103 and further details are discussed with respect to FIG. 3A and FIG. 3B.

One or more failure data processors 160 can restructure the failure data into a new signature and perform the signature processing 105 shown in FIG. 1A. The failure data processors 160 can read other signatures from the signature database 158 for comparing to the new signature. The failure data processors 160 can store the new signature as part of a cluster in the signature database 158 based on the comparison.

A code testing system 156 can be used to identify and fix failures in code. This can include executing the code with a test execution engine 162. A test configuration system 166 can cause the test execution engine 162 to configure an instance of a video game to be at a certain state (such as in a particular location on a particular level in the video game) and/or provide inputs (such as simulating user keystrokes, mouse movement, touchscreen input, voice input, controller input) to the test execution engine 162. To improve efficiency, the test configuration system 166 can set the state and/or provide inputs that are likely to cause failures and run variations of those states and/or inputs.

The test configuration system 166 can send a request, using an application program interface (API), to the signature analysis system. In some examples, the request can be a request to determine if a current state of the test execution system is likely to cause a failure. The failure data processors 160 can compare the state to paths to failure, and provide a response to the test configuration system 166 based on the comparison. In some examples, the request can be a request to receive states and/or inputs associated with a cluster, group, family, or any other level of failures. The failure data processors 160 can provide the requested state information and/or inputs as a response to the test configuration system 162, which can configure the test execution engine 162 to run instances of code based on the states and/or inputs.

A test analysis engine 164 can be used to log, debug, and/or diagnose failures detected during test executions. Failures detected by the test analysis engine 164 can be provided as failure data to the signature analysis system 154 for constructing a failure signature and storing the failure signature into the signature database 158.

Receiving and Using Code Failure Information

FIG. 2 is a flowchart 200 of an example of a process for receiving and using code failure information. When received, the code failure information can be stored as a signature in a signature database 158 as part of a cluster. When testing code of a video game, the signature can be retrieved from the signature database 158 in order to configure an instance of the video game to have a state that is likely to fail.

At block 201, a signature analysis system 154 receives first failure data from a first data source. The first data source can be, for example, any of the data sources 101 discussed with respect to FIG. 1A. The failure data can indicate that code associated with a video game failed in some manner or did not perform as intended by the developer.

At block 203, a failure data processor 160 processes the first failure data to identify a subset of failure data indicative of a potential bug or failure in the code of the video game. In some cases, a parameter function generated by a machine learning engine may be used to determine a likelihood that the first failure data contains data indicative of a code failure that may be used to diagnose, troubleshoot, or reproduce an occurrence of a failure in a subsequent execution of an instance of the video game In certain embodiments, the first failure data can include data that can be compared to other signatures to diagnose, troubleshoot, or predict a failure. For example, at least some failures may be correlated with a memory utilization rate, a system temperature, a sequence of inputs, a code version, and the like. The machine learning engine can determine correlations between different types of data and failure occurrences. The types of data satisfying different correlation thresholds may have different degrees of relevance in predicting a subsequent code failure. The types of information that are useful for diagnosing, troubleshooting, predicting, or reproducing failures can be determined by the machine learning engine 103 of FIG. 1A, and is further discussed with respect to FIG. 3A.

At block 205, a signature analysis system 154 can receive context data from a context data source. The context data source can be, for example, any additional data source that can provide additional context regarding a failure of an instance of the video game. For example, the context data source may include one or more of the additional data sources discussed with respect to FIG. 1A that differs from the first data source 101. The context data source may provide information in a different format compared to the first data source 101. The context data and the first failure data can both relate to a same instance of a video game or application where a code failure occurred and/or a same type of failure occurred. For example, a first data source can be a gaming console that generated a crash report for an online video game that crashed, and the context data source can be a server log from a server hosting the online video game. As a second example, a first data source can be a gaming console that generated a crash report for an online video game that crashed with error #12345, and the context data source can be a diagnostic report from a console in a test farm of consoles, where the console was running a different instance of the same video game that also crashed with error #12345. As a third example, a first data source can be an overheated gaming console that has frame rate drops during an online game, and a context data source can be a server hosting the online game, even though the server might not detect any errors. In some embodiments, the context data may or may not include any indication of the failure, but may provide additional information for analyzing or understanding the cause of a detected failure.

At block 207, one or more failure data processors 160 can process the context data. If the context data contains extraneous information, then a subset of the context data can be determined, where the subset of the context data includes the types of information that can be useful for comparing to other signatures in order to diagnose, troubleshoot, or reproduce a failure.

At block 209, one or more failure data processors 160 can create a first failure signature. The first failure signature can include at least the subset of the first failure data and the subset of the context data.

At block 211, the one or more failure data processors 160 can compare the first failure signature to one or more other failure signatures. Thus, in certain embodiments, to determine the cluster to place a new signature, the new signature may be compared to other signatures in a signature repository. The signatures may then be grouped into a cluster based on the closest association of the family within which the cluster should exist once the closest associated signature is identified. The comparison can be done as a weighted comparison. For example, the subset of first failure data in the first failure signature that was received from the first data source can be compared to a subset of data in a second failure signature that was also received from the first data source. The subset of context data in the first failure signature that was received from the context data source can be compared to a subset of data in the second failure signature that was also received from a context data source. The similarity of each comparison can be scored and multiplied by a weight, and then the plurality of weighted scores can be summed in order to determine a weighted similarity score.

Other similarity comparison scores (such as vector similarity techniques, cosine similarity, and the like) can also be used.

At block 213, a signature database 158 can store first failure signature can be stored as part of a cluster based at least in part on the comparison in block 211. The cluster that includes the first failure signature can include a second failure signature that is the most similar to the first failure signature, and/or at least has a minimum similarity score as compared to the first failure signature. In some embodiments, the first failure signature can be stored as part of the cluster based at least in part on having a minimum similarity score with some or all failure signatures in a cluster.

At block 215, the one or more failure data processors 160 can determine one or more states common to a plurality of signatures in the cluster. The state can be, for example, a state of a video game or application before a failure occurred. The state of an application can include, for example, what information was in a memory, what information was cached, what user inputs were being provided to a computer system, and the like. The game state data of a video game may include at least a minimum amount of data for loading or restoring a video game to a particular state. In some embodiments, a plurality of sequential states can be determined.

At block 217, a test system executing the code can be configured to have any of the states determined in block 215 or be configured to go through the sequence of states determined in block 215. The test system can then begin executing code at a point where a failure is likely to occur. Debug tools can be used in the test system to determine how the code proceeds so that any code failure can be analyzed. In some embodiments, from the state determined in block 215, any number of actions can be automatically or randomly generated by testing tools, and resulting failures can be reproduced, logged, and debugged.

Although the flowchart 200 is described at one hierarchical level (such as comparing a new failure signature to a second failure signature), the techniques can additionally or alternatively be applied at any combination of hierarchical levels. For example, at block 211, a new failure signature can be compared to failure paths of one or more clusters, and at block 213, stored in a cluster having a failure path that is similar to the new failure signature. As another example, a new failure signature can be first compared with groups of families to determine the most similar group of families, then compared with families to determine the most similar family within the group of families, then compared with clusters to determine the most similar cluster within the family.

Example Machine Learning System

The machine learning system 103 of FIG. 1A can use one or more model generation systems to generate one or more prediction models or parameter functions. One or more of these parameter functions may be used to determine an expected value or occurrence based on a set of inputs. For example, a first prediction model can be used to determine which types of information provided from various data sources are useful for troubleshooting failures based on one or more inputs to the prediction model. As a further example, a second prediction model can be used to predict the likelihood that a failure will occur based on one or more inputs to the prediction model. A number of different types of algorithms may be used by the machine learning system 103. For example, certain embodiments herein may use a logistical regression model. However, other models are possible, such as a linear regression model, a discrete choice model, or a generalized linear model.

The machine learning algorithms can be configured to adaptively develop and update the models over time based on new input received by the machine learning system 103. For example, the models can be regenerated on a periodic basis as new information is available from data sources, as signatures are used for troubleshooting failures, and as predictions of failures do or do not materialize. For example, the models can determine what types of data are similar when some, but not all, failures occur. Data that is always the same has less value for predicting failures. Likewise, data that is never common among different failure signatures also has less value for predicting failures. Types of data collected by debug tools can be more valuable. Types of data used to recreate states of an application can be more valuable. Types of data used during the debugging process can also be more valuable. The machine learning system 103 is described in more detail herein. After a model is generated, it can be provided to the signature processing system 105.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

Figure 3A:
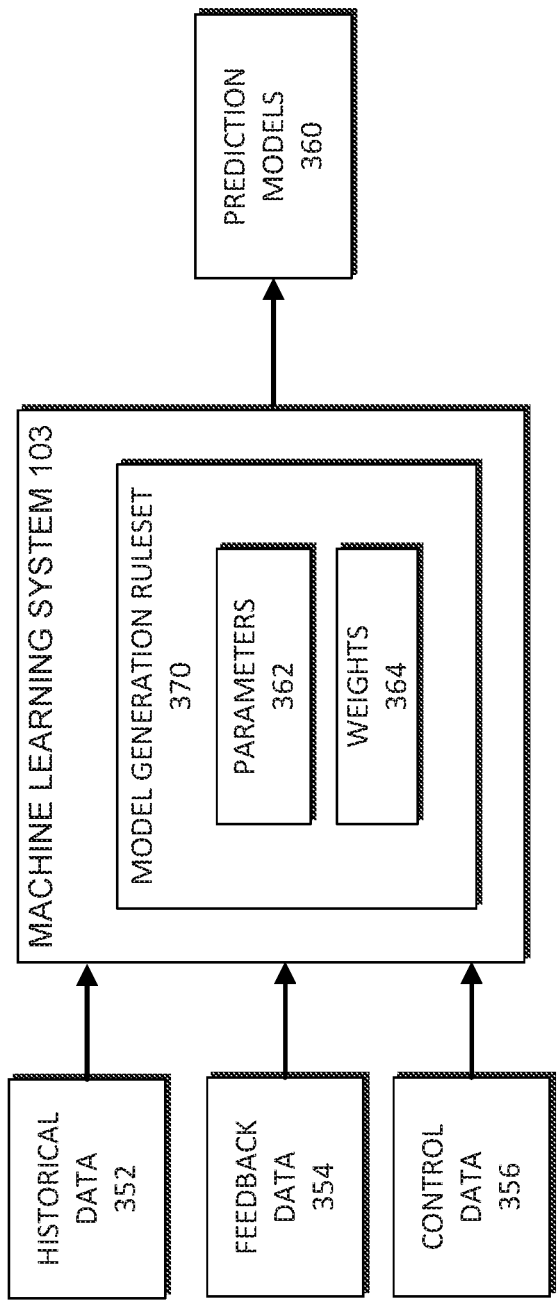
FIG. 3A shows an example of a model generation system.

FIG. 3A illustrates an embodiment of the machine learning system 103 of FIG. 1A for determining subsets of data to include in failure signatures. Another instance of the machine learning system 103 can be used for predicting failures, such as shown in FIG. 5. The machine learning system 103 may be used to determine one or more prediction models 360 based on historical data 352 for a number of failures. Typically, although not necessarily, the historical data 352 includes data associated with a large number of users, such as hundreds, thousands, hundreds of thousands, or more failures. However, the present disclosure is not limited as such, and the number of failures may include any number of failures. Further, the historical data 352 can include data received from one or more data sources, such as crash reports, forums, test results, simulation farms, and the like. Moreover, the historical data 352 can include data from different data sources, different data types, and any data generated by one or more user's interaction with a video game. In some embodiments, the historical data 352 may include a very large number of data points, such as millions of data points, which may be aggregated into one or more data sets. In some cases, the historical data 352 may be accessed from a user data repository or database. In some embodiments, the historical data 352 is limited to historical information about a video game 312, but in other embodiments, the historical data 352 may include information from one or more other video games or companion applications. Further, in some embodiments, one or more subsets of the historical data are limited by a date restriction, such as for example, limited to include only data from the last 6 months.

The machine learning system 103 may, in some cases, also receive feedback data 354. This feedback data 354 may be received as part of a supervised model generation process that enables a user, such as an administrator, to provide additional input to the machine learning system 103 that may be used to facilitate generation of the prediction model 360. The feedback data 354 can also be automatically generated, for example, based on the similarities of portions of signatures with portions of other signatures, similarities of groups with other groups, similarities of clusters with other clusters, and/or similarities of families with other families. The feedback data 354 can also include whether or not tests based on failure signatures or portions thereof result in failures, and this feedback data 354 can be used to improve failure predictions. It can be automatically determined that some types of fields are useful for determining similarities, such as a code build version, a failure type, the name of a program that failed, a hardware configuration, an operating system version, some memory states, and the like. It can also be determined that other types of data fields may contribute less to determinations of similarity. Data fields that are not useful for finding similarities can be omitted when creating failure signatures.

Further, the machine learning system 103 may receive control data 356. This control data 356 may identify one or more features or characteristics for which the machine learning system 103 uses to determine a model. Further, in some cases, the control data 156 may indicate a value for the one or more features identified in the control data 356. For example, suppose the control data 356 indicates that a prediction model is to be generated using the historical data 352 to determine a likelihood of failure based on a new failure signature when an identical failure signature is already stored as part of the historical data. The control data can ensure that the predicted failure rate is 100%.

The machine learning system 103 may generally include a model generation rule set 370 for generation of the prediction model 360. The rule set 370 may include one or more parameters 362. Each set of parameters 162 may be combined using one or more mathematical functions to obtain a parameter function. Further, one or more specific parameters may be weighted by the weights 364. In some cases, the parameter function may be obtained by combining a set of parameters with a respective set of weights 364. The prediction model 360 and/or the respective parameters 362 of the prediction models 360 may be derived during a training process based on particular input data, such as the historical data 352, feedback data 354, and control data 356, and defined output criteria, which may be included with the control data 356, used for training purposes. The model generation rule set 370 can define the specific machine learning rules and/or algorithms the machine learning system 103 uses to generate the model based on a defined objective function, such as determining a churn rate. In some embodiments, initial parameters 362 and weights 364 can be manually provided during the initiation of the model generation process. The parameters 362 and weights 364 can be updated and modified during the model generation phase to generate the prediction model 360. In some embodiments, weights may be applied to the parameter functions or prediction models themselves. For example, the mathematical complexity or the number of parameters included in a particular prediction model 360 may affect a weight for the particular prediction model 360, which may impact the generation of the model and/or a selection algorithm or a selection probability that the particular prediction model 360 is selected.

The machine learning system 103 can filter and categorize the historical data sets according to various characteristics and parameters of the data. For example, the data can be categorized by the data source (such as, for example, game application data, host application data, or user profile data), data type (such as, for example, whether the data is about the video game, about a code version, about replays, about a state of a video game, about player inputs to a video game system, about memory, about servers, and the like) or other categories associated with the data. The machine learning system 103 can filter the information for further processing. In some embodiments, the machine learning system 103 is configured to filter and separate the historical data 352 into a plurality of data types or categories before further processing. Moreover, in some cases, some of the historical data 352 may be filtered out or removed from the historical data 352 based on the data being associated with a relevance that does not satisfy a threshold relevance as determined by the machine learning system 103.

After the prediction models 360 have been generated, one or more models can be used when receiving data from various data sources to construct failure signatures that include useful subsets of data received from various data sources. This can include selecting subsets of the data from the various data sources to construct a failure signature, the selected subsets being more useful for determining similarities than subsets of the various data sources that are not included. One or more other prediction models can be used to predict the likelihood of a failure based on an amount of similarity between a new signatures and failure signatures and/or paths to failures.

Figure 3B:
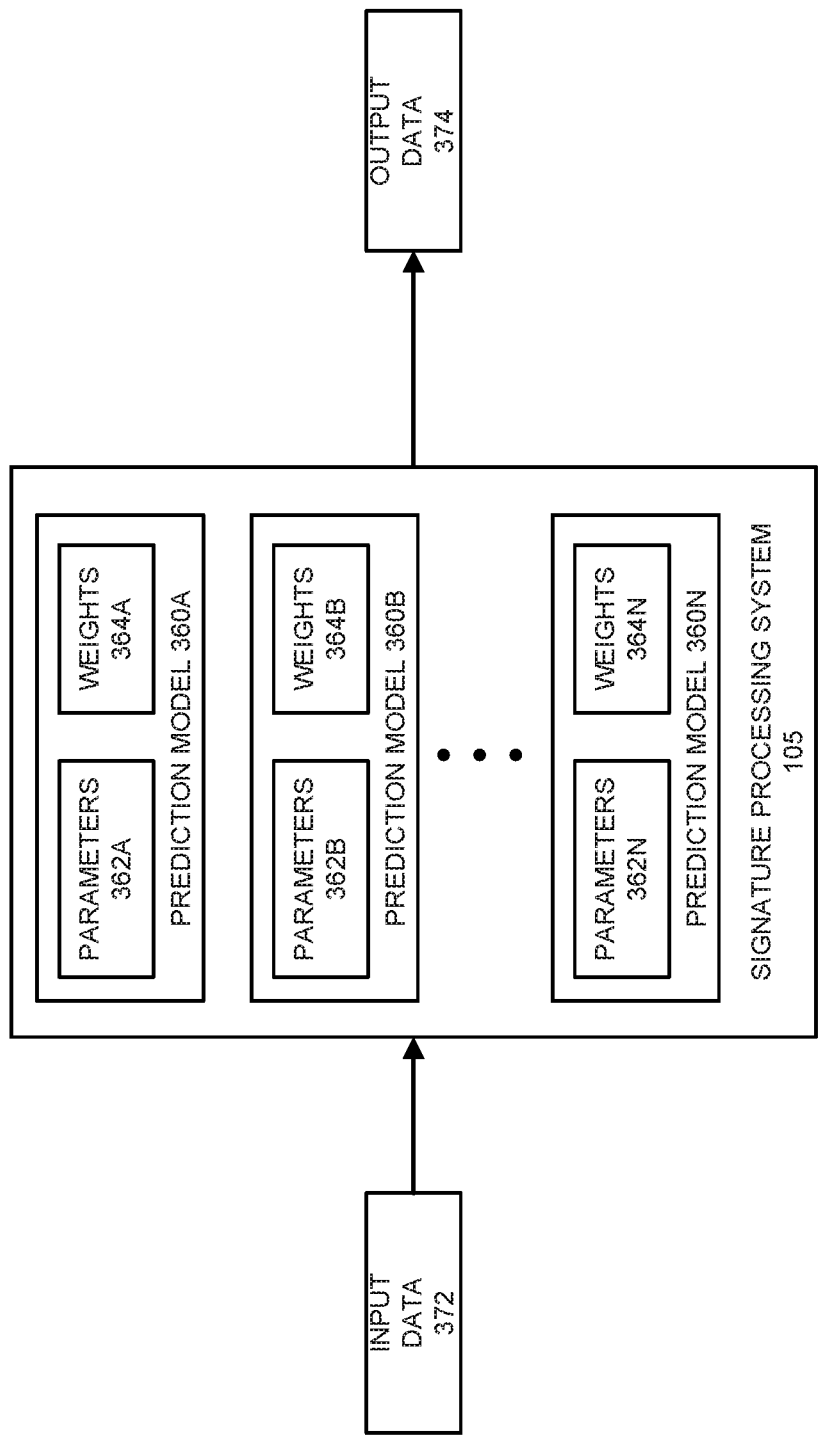
FIG. 3B shows an example of a signature processing system.

FIG. 3B illustrates an embodiment of a signature processing block 105 of FIG. 1A. The signature processing block 105 can apply or use one or more of the prediction models 360 generated by the machine learning system 103. Although illustrated as a separate system, in some cases, the features of the signature processing block 105 can be mingled with the machine learning system 103. The signature processing block 105 may use one or more prediction models 360A, 360B, 360N (which may be referred to collectively as "prediction models 360" or in the singular as "prediction model 360") to process the input data 372 to obtain the output data 374.

The signature processing block 105 may apply the prediction model(s) 360 to data from a data source 101 of FIG. 1A to determine a subset of the data that is useful for troubleshooting a failure. In some embodiments, a single prediction model 360 can be used for each prediction. However, multiple prediction models 360 can also be used for each prediction.

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A).

Example Target Testing

FIG. 4A shows a flowchart 400 of an example of a process for target testing code to troubleshoot one or more failures in video game code. The failures may be associated with signatures that are included in a cluster of failure signatures (for example, in signature database 158 of FIG. 1B). For example, some failure signatures in a signature database 158 may relate to a similar issue (such as a screen turning black while video should be playing instead). Within the cluster, some failure signatures may indicate that the screen turns black during a first time, place, or state (such as toward the beginning of level 2 in a video game) while other signatures may indicate that the screen turns black at a different time, place, or state (such as toward the end of level 2 in a video game). These failure signatures can be clustered together based at least in part on the same video display failure occurring on a similar level, and a path to the black screen failures on level 2 can be determined. Simulations based on the path and/or failure signatures in the cluster can be executed by the code testing system 156 of FIG. 1B to reproduce and debug the failure.

At block 401, one or more failure data processors 160 receive a request (for example, as shown in FIG. 1B) to target test code for failures based on a cluster of failure signatures. For example, there can be a cluster of failure signatures related to a particular black screen error, and a request can be made to run simulations to target test code in order to diagnose the cause of the black screen error.

At block 403, one or more failure data processors 160 can identify a path to failure (also referred to as a failure path) for the cluster. The path to failure can include similarities between one or more failure signatures in the cluster. The path to failure can include one or more states of an application, a series of inputs leading up to the failure, and the like. A failure path can include more than a state of the application at one time. A failure path can include information relating to computing resources used by the video game, the state of the video game preceding a failure, the state of the video game upon occurrence of the failure, and any additional telemetry data that can be used to simulate or repeat the occurrence of a failure for, for example, testing purposes.

At block 405, a code testing system 156 launches a test simulation based at least in part on the path to failure. The block 405 can include, for example, executing an instance of the code being tested in a software and hardware environment identified in the path to failure, configuring a memory state of a system testing the code to match a memory state in the path to failure, apply inputs in an order included in the path to failure, and reaching a subsequent memory state along the path to failure. For example, suppose that a cluster has a failure path for a video game executing on a particular console. And suppose that the failure path indicates that if a player goes to a first location in level 2, presses buttons A, B, and C, and then moves to a second location in the level, then the screen turns black about 5 minutes later. A test simulation can be performed on the console or console emulator, where the memory of the console is configured to load the level at the first location, receive inputs A, B, and C, move the character to the second location, and then continue to run the test simulation for at least another 5 minutes.

At block 407, the test simulations can continue to run in the test execution engine 162 of the code testing system 156 with variations, using the path to failure as an initial simulation seed. Variations of inputs (such as applying inputs A and B without C, performing random actions during the 5 minutes) can be generated by the test configuration system 166 and applied to the test simulations from any point along the path to failure to see how the different inputs do or do not cause the failure to materialize. The test simulations can continue to run under debug conditions where, for example, there can be a log of all memory actions, inputs, logs of how code is executing, and the like. The operations associated with the block 407 may cease after a particular number of test simulations are performed, in response to a command, when a failure occurs during a test simulation, when an expected failure does not occur during a test simulation, or in response to a process completion condition being satisfied. In certain embodiments, the block 407 is optional or omitted.

Although FIG. 4A is described with respect to troubleshooting a cluster of failures, the teachings can be applied at different levels of failure grouping, including quadrants, families, and/or groups of families.

FIG. 4B shows a flowchart 420 of an example of a process for target testing code to troubleshoot a particular type of failure.

At block 421, one or more failure data processors 160 can receive a request to target test a type of failure. The request can identify, for example, an application title, a code version, a platform or operating system, and the type of failure. Example types of failures can include, for example, a crash, a blue screen, a video error, frame rate issues, and the like. In some embodiments, the type of error can be identified more particularly, such as a frame rate drop that occurs for a video game on a console on level 1 after 15 minutes.

At block 423, the one or more failure data processors 160 identifies one or more signatures, clusters, quadrants, families, or groups including the type of failure identified in the request in block 421. For example, if the request is for a graphics bug that causes certain visual objects on a screen not to render correctly, then the one or more failure data processors 160 can search the database (or an index thereof) for signatures, clusters, quadrants, families, or groups having paths to graphics bugs.

At block 425, a code testing system 156 launches one or more test simulations configured with the path to failure of the signature, cluster, quadrant, family, or group that includes the type of failure. Configuring the test simulation can include running the simulation through a plurality of states and providing a sequence of inputs according to the path to failure. For example, as discussed with respect to block 405, the test simulation load a level at the first location, receive inputs A, B, and C, move the character to the second location, and then continue to run the test simulation for at least another 5 minutes.

At block 427, a test configuration system 166 can configure variations of the one or more test simulations to be executed in the test execution engine 162. For example, continuing the example discussed with respect to block 405, a test analysis engine can determine if the failure occurs only when receiving input "C" in the sequence of A, B, and C by also testing the other variations such as C, A, and B. If the failure does not occur based on the variations, then the cause of the failure can be traced at least in part to the particular order of inputs. Operations of the block 427 may be repeated until the failure no longer manifests, all variations have been performed, a command is received, or another process ending trigger occurs. In some embodiments, if the cause of the failure is discovered and the underlying code is patched, then the patched code can be regression tested based on the path to failure and its variations.

The methods 400 and 420 can provide efficiency benefits when launching and testing simulations of video game code to troubleshoot failures. Often, code can be randomly tested by executing the code and then applying random inputs. However, there can be an infinite combination of input permutations that can be applied, and it may be impossible to test every combination. Random tests can take vast amounts of computing power and may reveal very few failures. However, if the testing environment is configured such that an application proceeds along a path to failure, it is easier to reproduce or introduce failures making it easier to debug or fix coding errors compared to testing processes that do not rely on paths to failure as described herein.

Example Prediction of Failure Chance

FIG. 5 is a flowchart 500 of an example of a process for predicting a failure given a new signature. A signature analysis system, such as shown in FIG. 1B, can receive requests to determine if certain conditions are likely to fail. The signature analysis system 154 can compare the conditions to failure signatures in a database, determine a chance of failure, and indicate a likelihood of failure as a response.

At block 501, one or more failure data processors 160 in a signature analysis system receive a new signature or portion of a new signature from a test analysis engine of a code testing system. The request can include a signature including data from a plurality of different data sources. The new signature can include, for example, a current state, a history of previous inputs, previous states, and the like of an instance of code being executed by a test execution engine.

At block 503, one or more failure data processors 160 search a database (or an index thereof) for a match with a failure signature already saved in the signature database 158. It may be determined that there is a match between the new signature and a failure signature in the signature database 158 is the two signatures match by at least a threshold percentage. If a match is found, then at block 505, a first chance of failure can be returned. The chance of failure may be determined based on the level or percentage of similarity between the new signature and a failure signature in the signature database 158. If an entire signature is identically matched, then the chance may be higher (such as closer to 100%) than if only a portion of the signature is matched with a failure signature in the database.

If a match is not found at block 503, then at block 507, the one or more failure data processors 160 search the database (or index thereof) for similarities between the new failure signature and signatures in an existing cluster. The similarity matching may be performed, for example, via a weighted comparison between the new signature and one or more signatures in a cluster. If a minimum amount of similarity is determined, then at block 509, a second chance of failure can be determined based on the degree of similarities and/or the number of similar signatures. For example, it can be determined that there is anywhere between a 30%-90% chance of failure. If the new signature almost completely matches a large number of signatures in the database, then it can be determined that there is a chance of failure such as 80%, 90%, and the like. Furthermore, if the new signature almost matches a large number of signatures of one cluster, then it can also be predicted that the type of failure that will occur will be the type of failure common to that cluster. If the new signature matches a fewer number of signatures in a cluster to a lesser degree, then it can be determined that there is a chance of failure such as 30%, 40%, and the like.

If a match is not found at block 507, then at block 511, the one or more failure data processors 160 search the signature database 158 (or index thereof) for similarities between the new failure signature and failure paths at a higher level. This can be done, for example, by performing a weighted comparison between the new signature and the failure paths of a quadrant, family, and/or group of families. If a minimum amount of similarity is determined, then at block 509, a second chance of failure can be determined based on the degree of similarities and/or the number of similar signatures. For example, it can be determined that there is anywhere between a 10%-50% chance of failure. If the new signature almost completely matches the failure paths of a large number of clusters, quadrants, families, or groups of families, then it can be determined that there is a chance of failure such as 40%, 50%, and the like. If the new signature matches a fewer number of signatures in a cluster to a lesser degree, then it can be determined that there is a chance of failure such as 10%, 20%, and the like.

If it is determined at block 515 that there is less than a threshold degree of similarity with any signature, cluster, family, or group, then at block 517, a fourth chance of failure can be provided as a response by the one or more failure processors 160. The fourth chance of failure can be low, for example, 0% or 10%. In some embodiments, an additional step can be taken to add the new signature to a cluster in a database.

The chances can be determined using a model, for example, as described with respect to FIG. 3A. Furthermore, actual results of whether or not a prediction is correct can be provided as feedback data 354 to the model.

The likelihood of failure can be used to expedite testing and catch failures that would otherwise be missed. For example, during a simulation of a video game in a code testing system, a signature analysis system can determine that a state of a video game almost nearly (but not exactly) matches a known path to failure and that there is a 90% chance of failure. However, the simulation of the video game in the code testing system completes without any failure. It is possible that the failure was not exactly triggered to cause the failure to materialize. However, because that particular simulation came very close to failing, the code testing system can re-run the code simulation multiple times to ensure that the failure does not occur. The code testing system can also re-run the code simulation multiple times with small variations in an attempt to trigger the failure. Through either re-run technique, a failure might be triggered that would otherwise not have been caught.

In some embodiments, test farms can execute a plurality of code simulations while a debug or logging feature is off. This can save processing power and memory. The simulations can periodically check if a state of the simulation is likely to fail. If it is determined that there is more than a minimum threshold chance of failure (such as 25%, 50%, 75%), then the debugging tools and logging tools can be turned on for the simulation that is likely to fail.

Hierarchical Analysis

The system 100 shown in FIG. 1A can allow for a multi-level view of failures. Failure signatures, paths to failure at the cluster level, paths to failure at the quadrant level, paths to failure at the family level, and paths to failure at the groups of family level can be displayed in a user interface, allowing code developers to better troubleshoot a failure. For example, given one hierarchical level of information, the failure signatures, developers might have enough data to reproduce failures, but due to the amount of extra information, it can be difficult or impossible to determine what exactly is causing a specific failure. However, at the cluster or family, a path to failure might more specifically indicate what is causing that specific failure, along with one or more other similar or related failures.

In some embodiments, a user interface can display a heatmap, graph, table, or other visual structure to represent the amount and distribution of types of code failures. The user interface can allow a code developer to view representations of data stored in the signature database 158. For example, in certain embodiments, the interface may display categories of failures (such as graphics errors, stop errors, crash errors, and the like) organized by video game title, and display a number of reported and/or unresolved code failures. A code developer can search/filter for types of failures according to various criteria. In response to a user selecting an individual failure, the user interface can display signature information from the signature database 158 associated with the selected failure. Further, the user interface may display data from a plurality of data sources 101 associated with the selected failure. For example, selecting a failure that occurred on a computer while a player was running a video game can cause the associated failure signature to be displayed, along with any related replays of the video game, information from a server that hosted the video game, information from the computer or console that ran the video game, information from a test farm that attempted to reproduce the failure, and any forum posts about the failure.

A code developer can select one or more failures, one or more clusters, one or more quadrants, one or more families, and/or one or more groups of families. Further, the system can automatically generate test configuration settings based at least in part on the selection by the code developer. The test settings can be used to configure a test execution engine to run simulations based on the selected failures, clusters, quadrants, families, and/or groups of families and variations thereof.

Example Video Game Computing System

FIG. 6 illustrates an embodiment of a user computing system 600, which may also be referred to as a gaming system. As illustrated, the user computing system 600 may be a single computing device that can include a number of elements. However, in some cases, the user computing system 600 may include multiple devices. For example, the user computing system 600 may include one device that includes a central processing unit and a graphics processing unit, another device that includes a display, and another device that includes an input mechanism, such as a keyboard or mouse.

The user computing system 600 can be an embodiment of a computing system that can execute a game application. In the non-limiting example of FIG. 6, the user computing system 600 is a touch-capable computing device capable of receiving input from a user via a touchscreen display 602. However, the user computing system 600 is not limited as such and may include non-touch capable embodiments, which do not include a touchscreen display 602.

The user computing system 600 includes a touchscreen display 602 and a touchscreen interface 604, and is configured to execute a game application. A game engine 612 can execute a game application 610. Although described as a game application 610, in some embodiments the application may be another type of application that may be capable of interacting with multiple users across multiple user computing systems, such as educational software or language software. While user computing system 600 includes the touchscreen display 602, it is recognized that a variety of input devices may be used in addition to or in place of the touchscreen display 602.

The user computing system 600 can include one or more processors, such as central processing units (CPUs), graphics processing units (GPUs), and accelerated processing units (APUs). Further, the user computing system 600 may include one or more data storage elements. In addition, the user computing system 600 may include one or more volatile memory elements, such as random-access memory (RAM). In some embodiments, the user computing system 600 can be a specialized computing device created for the purpose of executing game applications 610. For example, the user computing system 600 may be a video game console. The game applications 610 executed by the user computing system 600 may be created using a particular application programming interface (API) or compiled into a particular instruction set that may be specific to the user computing system 600. In some embodiments, the user computing system 600 may be a general purpose computing device capable of executing game applications 610 and non-game applications. For example, the user computing system 600 may be a laptop with an integrated touchscreen display or desktop computer with an external touchscreen display. Components of an example embodiment of a user computing system 600 are described in more detail with respect to FIG. 7.

The touchscreen display 602 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 602. The touchscreen interface 604 can be configured to translate the touch input into data and output the data such that it can be interpreted by components of the user computing system 600, such as an operating system and the game application 610. The touchscreen interface 604 can translate characteristics of the tactile touch input touch into touch input data. Some example characteristics of a touch input can include, shape, size, pressure, location, direction, momentum, duration, and/or other characteristics. The touchscreen interface 604 can be configured to determine the type of touch input, such as, for example a tap (for example, touch and release at a single location) or a swipe (for example, movement through a plurality of locations on touchscreen in a single touch input). The touchscreen interface 604 can be configured to detect and output touch input data associated with multiple touch inputs occurring simultaneously or substantially in parallel. In some cases, the simultaneous touch inputs may include instances where a user maintains a first touch on the touchscreen display 602 while subsequently performing a second touch on the touchscreen display 602. The touchscreen interface 604 can be configured to detect movement of the touch inputs. The touch input data can be transmitted to components of the user computing system 600 for processing. For example, the touch input data can be transmitted directly to the game application 612 for processing.

In some embodiments, the touch input data can undergo processing and/or filtering by the touchscreen interface 604, an operating system, or other components prior to being output to the game application 610. As one example, raw touch input data can be captured from a touch input. The raw data can be filtered to remove background noise, pressure values associated with the input can be measured, and location coordinates associated with the touch input can be calculated. The type of touch input data provided to the game application 610 can be dependent upon the specific implementation of the touchscreen interface 604 and the particular API associated with the touchscreen interface 604. In some embodiments, the touch input data can include location coordinates of the touch input. The touch signal data can be output at a defined frequency. Processing the touch inputs can be computed many times per second and the touch input data can be output to the game application for further processing.

A game application 610 can be configured to be executed on the user computing system 600. The game application 610 may also be referred to as a video game, a game, game code and/or a game program. A game application should be understood to include software code that a user computing system 600 can use to provide a game for a user to play. A game application 610 might comprise software code that informs a user computing system 600 of processor instructions to execute, but might also include data used in the playing of the game, such as data relating to constants, images and other data structures. For example, in the illustrated embodiment, the game application includes a game engine 612, game data 614, and game state information 616. As previously stated, the embodiments described herein may be used for applications other than video games, such as educational software or videoconferencing. Thus, in some such cases, the game application 610 may be substituted with other types of applications that may involve multiple users communicating over a network and selecting a server, or one of the plurality of user computing systems, to act as a host.

The touchscreen interface 604 or another component of the user computing system 600, such as the operating system, can provide user input, such as touch inputs, to the game application 610. In some embodiments, the user computing system 600 may include alternative or additional user input devices, such as a mouse, a keyboard, a camera, a game controller, and the like. Further, the user computing system 600 may include a virtual reality display and/or an augmented reality display. A user can interact with the game application 610 via the touchscreen interface 604 and/or one or more of the alternative or additional user input devices. The game engine 612 can be configured to execute aspects of the operation of the game application 610 within the user computing system 600. Execution of aspects of gameplay within a game application can be based, at least in part, on the user input received, the game data 614, and game state information 616. The game data 614 can include game rules, prerecorded motion capture poses/paths, environmental settings, constraints, animation reference curves, skeleton models, and/or other game application information. Further, the game data 614 may include information that is used to set or adjust the difficulty of the game application 610.

The game engine 612 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 610, the game application 610 can store game state information 616, which can include character states, environment states, scene object storage, and/or other information associated with a state of execution of the game application 610. For example, the game state information 616 can identify the state of the game application at a specific point in time, such as a character position, character action, game level attributes, and other information contributing to a state of the game application.

The game engine 612 can receive the user inputs and determine in-game events, such as actions, collisions, runs, throws, attacks and other events appropriate for the game application 610. During operation, the game engine 612 can read in game data 614 and game state information 616 in order to determine the appropriate in-game events. In one example, after the game engine 612 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

In some cases, at least some of the video game engine 612 may reside on a server, such as one of the video game servers 152. Further, in some cases, the complete video game engine 612 may reside on the server. Thus, in some cases, the video game engine 612 may be omitted from the portion of the video game application 610 hosted on the user computing system 110. Similarly, in some embodiments, video game state information 616 and video game data 614 may be hosted on a server in addition to or instead of on the user computing system 110. Further, in some cases, actions of the user performed within the video game application 610 may be transmitted to a server that is hosting a portion of the video game 612. The server may compute or determine the result of the user's interaction with respect to the video game application 610, such as collisions, attacks, or movements. The server may then send a result of the user's actions to the video game application 610 on the user computing system 110. The video game application 610 may then perform an action in response to the result, such as displaying the result to the user.

Example Hardware Configuration of Computing System

FIG. 7 illustrates an embodiment of a hardware configuration for the user computing system of FIG. 6. Other variations of the computing system 710 may be substituted for the examples explicitly presented herein, such as removing or adding components to the computing system 710. The computing system 710 may include a computer, a server, a smart phone, a tablet, a personal computer, a desktop, a laptop, a smart television, and the like.

As shown, the computing system 710 includes a processing unit 20 that interacts with other components of the computing system 710 and also components external to the computing system 710. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The computing system 710 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing system 710 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 710 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the computing system 710. The storage element 40 can store a database that includes the failure signatures, clusters, families, and groups of families. Processing unit 20 can communicate through I/O 32 to store data, such as game state data and any shared data files. In addition to storage 40 and removable storage media 44, the computing system 710 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 710 on a display device, such as graphics, user interfaces, video, and/or other visual content. The computing system 710 may comprise one or more integrated displays configured to receive display output signals produced by the display I/O 36, which may be output for display to a user. According to some embodiments, display output signals produced by the display I/O 36 may also be output to one or more display devices external to the computing system 710.

The computing system 710 can also include other features that may be used with a game, such as a clock 50, flash memory 52, and other components. An audio/video player 56 might also be used to play a video sequence, such as a movie. It should be understood that other components may be provided in the computing system 710 and that a person skilled in the art will appreciate other variations of the computing system 710.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 710 is turned off or loses power.

As computing system 710 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method for video game failure analysis comprising:
as implemented by an interactive computing system configured with specific computer-executable instructions,
receiving, from two or more different devices, data about an instance of a video game where a failure occurred, including:
receiving, from a first data source device, first failure data related to the instance of the video game where the failure occurred in the video game; and
receiving, from a context data source device, context data that relates to the instance of the video game where the failure occurred in the video game;
creating a first failure signature based at least on a combination of a subset of the first failure data and a subset of the context data;
comparing the first failure signature to a cluster of failure signatures using a weighted comparison;
determining based on the weighted comparison that the first failure signature has a threshold similarity to signatures included in the cluster of failure signatures, wherein the signatures included in the cluster of failure signatures relate to failures that occurred as a result of coding errors in a code of the video game;
including the first failure signature as part of the cluster of failure signatures;
determining a first video game state and a failure path based at least in part on a plurality of signatures in the cluster, the first video game state at least partially matching one or more video game states associated with the plurality of signatures in the cluster, the failure path defining a sequence of inputs applied within the video game to arrive at a second video game state associated with the failure;
using the first video game state to configure a test instance of the video game to execute the video game in the first video game state;
executing the test instance of the video game in the first video game state; and
inputting the sequence of inputs within the test instance of the video game to arrive at the second video game state associated with the failure in the video game.

2. The method of claim 1, wherein:
the first failure data includes a sequence of logged events that occurred in a computing system before the computing system had the failure.

3. The method of claim 1, further comprising:
receiving a second video game state for analysis;
comparing parts of the second video game state to the first failure signature; and
based at least in part on a match between a portion of the second video game state and a portion of the first failure signature, determining a probability that the second video game state will lead to a failure.

4. The method of claim 1, further comprising:
running a second test instance of the video game based at least in part on a variation of the first failure signature.

5. The method of claim 1,
wherein the first data source device includes an end user device running the instance of the video game; and
wherein a second data source device includes at least one of:
a forum server for reporting failures of a video game;
a hosting server that generates failure reports and hosts the video game;

a test environment configured to generate failure data from executing one or more instances of the video game;
a debug system providing video game debug data;
a database system identifying relationships between players and video games;
a test system providing metadata about testing the video game; or
a storage device storing video game replay data.

6. The method of claim 1, further comprising:
comparing the cluster to a second cluster; and
storing the cluster and the second cluster in a database as part of a family of clusters.

7. The method of claim 1, further comprising:
determining the subset of the first failure data based at least in part on a model generated by a machine learning system; and
determining the subset of the context data based at least in part on the model.

8. A system comprising:
one or more processors;
computer-readable storage medium storing computer readable instructions that, when executed by one or more processors, causes the system to perform operations comprising:
receiving, from two or more different devices, data about an instance of a video game where a failure occurred in the video game, including:
receiving, from a first data source device, first failure data related to the instance of the video game where the failure occurred in the video game; and
receiving, from a context data source device, context data that relates to the same instance of the video game where the failure occurred in the video game;
generating a first failure signature based at least in part on combination of a subset of the first failure data and a subset of the context data;
comparing the first failure signature to a cluster of failure signatures using a weighted comparison;
determining based on the weighted comparison that the first failure signature has a threshold similarity to signatures included in the cluster of failure signatures, wherein the signatures included in the cluster of failure signatures relate to failures that occurred in a code of the video game;
including the first failure signature as part of the cluster of failure signatures;
determining a first video game state and a failure path based at least in part on a plurality of signatures in the cluster, the first video game state at least partially matching one or more video game states associated with the plurality of signatures in the cluster, the failure path defining a sequence of inputs applied within the video game to arrive at a second video game state associated with the failure;
using the first video game state to configure a test instance of the video game to satisfy the first video game state determined based at least in part on the plurality of signatures in the cluster;
executing the test instance of the video game in the first video game state; and
inputting the sequence of inputs within the test instance of the video game to arrive at the second video game state associated with the failure in the video game.

9. The system of claim 8, wherein:
the first failure data includes a sequence of logged events that occurred in a computing system before the computing system had the failure.

10. The system of claim 8, wherein:
the system is further configured to perform operations including receiving a second video game state for analysis; and
the one or more processors are configured to perform operations comprising:
comparing parts of the second video game state to the first failure signature; and
based at least in part on a match between a portion of the second video game state and a portion of the first failure signature, determining a probability that the second video game state will lead to a failure.

11. The system of claim 8, wherein the one or more processors are configured to run a second test instance of the video game based at least in part on a variation of the first failure signature.

12. The system of claim 8,
wherein the context data source device includes one of:
a forum server for reporting failures of a video game;
a hosting server that hosts the video game and generates failure reports;
a test environment configured to generate failure data from executing one or more instances of the video game;
a debug system providing video game debug data;
a database system identifying relationships between players and video games;
a test system providing metadata about testing the video game; and
a storage device storing video game replay data; and
wherein the first data source device is an end-user device where the failure occurred in the instance of the video game.

13. The system of claim 8, wherein the system is further configured to perform operations comprising:
compare the cluster to a second cluster; and
storing the cluster and the second cluster in a database as part of a family of clusters.

14. The system of claim 8, wherein the one or more processors are further configured to:
determine the subset of the first failure data based at least in part on a model generated by a machine learning system; and
determine the subset of the context data based at least in part on the model.

15. A non-transitory, computer-readable storage medium storing computer readable instructions that, when executed by one or more computing devices, causes the one or more computing devices to perform operations comprising:
receiving, from two or more different devices, data about an instance of a video game where a failure occurred in the video game, including:
receiving, from a first data source device, first failure data related to the instance of the video game where the failure occurred in the video game; and
receiving, from a context data source device different from the first data source device, context data that relates to the same instance of the video game where the failure occurred;
creating a first failure signature based at least in part on a combination of a subset of the first failure data and a subset of the context data;

comparing the first failure signature to a cluster of failure signatures using a weighted comparison;
determining based on the weighted comparison that the first failure signature has a threshold similarity to signatures included in the cluster of failure signatures, wherein the signatures included in the cluster of failure signatures relate to failures that occurred as a result of coding errors in a code of the video game;
including the first failure signature as part of the cluster of failure signatures;
determining a first video game state and a failure path based at least in part on a plurality of signatures in the cluster, the first video game state at least partially matching one or more video game states associated with the plurality of signatures in the cluster, the failure path defining a sequence of inputs applied within the video game to arrive at a second video game state associated with the failure;
using the first video game state to configure a test instance of the video game to satisfy the first video game state determined based at least in part on the plurality of signatures in the cluster;
executing the test instance of the video game in the first video game state; and
inputting the sequence of inputs within the test instance of the video game to arrive at the second video game state associated with the failure in the video game.

16. The non-transitory, computer-readable storage medium of claim 15, wherein:
the first failure data includes a sequence of logged events that occurred in a computing system before the computing system had the failure.

17. The non-transitory, computer-readable storage medium of claim 15, the operations further comprising:
receiving a second video game state for analysis;
comparing parts of the second video game state to the first failure signature; and
based at least in part on a match between a portion of the second video game state and a portion of the first failure signature, determining a probability that the second video game state will lead to a failure.

18. The non-transitory, computer-readable storage medium of claim 15, the operations further comprising:
running a second test instance of the video game based at least in part on a variation of the first failure signature.

19. The non-transitory, computer-readable storage medium of claim 15,
wherein the context data source device includes one of:
a forum server for reporting failures of a video game;
a database system storing video game failure reports generated on end-user devices in response to failures of the video game;
a hosting server that hosts the video game and generates failure reports;
a test environment configured to generate failure data from executing one or more instances of the video game;
a debug system providing video game debug data;
a database system identifying relationships between players and video games;
a test system providing metadata about testing the video game; and
a storage system storing video game replay data.

20. The non-transitory, computer-readable storage medium of claim 15, the operations further comprising:
comparing the cluster to a second cluster; and
storing the cluster and the second cluster in a database as part of a family of clusters.

* * * * *